United States Patent [19]

Shimizu

[11] Patent Number: 5,076,450

[45] Date of Patent: Dec. 31, 1991

[54] METHOD AND APPARATUS FOR REDUCED RADIUS TURNING FOR LARGE RAIL MOUNTED CRANES

[75] Inventor: Yuso Shimizu, San Mateo, Calif.

[73] Assignee: Paceco Corp., San Mateo, Calif.

[21] Appl. No.: 510,281

[22] Filed: Apr. 17, 1990

[51] Int. Cl.$^5$ .......................... B66C 5/02; B66C 19/00; B62D 61/10; B61C 5/00

[52] U.S. Cl. .................................... 212/218; 212/226; 212/124; 105/165; 105/163.1; 180/24.02; 280/98

[58] Field of Search ............... 212/124, 218, 226, 189, 212/219; 105/165, 167, 215.1, 180, 157.1, 176, 199.1, 215, 157; 280/98; 180/24.02, 209, 24

[56] References Cited

U.S. PATENT DOCUMENTS 3,877,391 4/1975 Gimperlein et al. .......... 212/218 X

FOREIGN PATENT DOCUMENTS 717548 8/1938 Fed. Rep. of Germany .......... 212/5

*Primary Examiner*—Sherman Basinger
*Assistant Examiner*—Kenneth Lee
*Attorney, Agent, or Firm*—Bruce & McCoy

[57] ABSTRACT

Method and apparatus for reduced radius turning for large cranes mounted on curved sections of rails or track which is effected by lifting the outboard sets of wheels of the crane supporting bogies which are located at the corners of the cranes disposed over the rails having the shortest radius of curvature on the inside of the turn and then lowering the bogies when the crane is on a straight section of track.

5 Claims, 5 Drawing Sheets

METHOD AND APPARATUS FOR REDUCED RADIUS TURNING FOR LARGE RAIL MOUNTED CRANES

BACKGROUND OF THE INVENTION

1. Field of the Invention

The present invention relates to a method and apparatus for reduced radius turning for large gantry type cranes which run on rails or tracks, and more particularly, to a means for lifting a portion of the sets of wheels which support the crane whereby the radius for the turns in the tracks can be substantially shortened.

2. Description of the Prior Art

Prior to the development of the present invention, it was necessary in order for a large gantry crane to traverse a turn or curve on its support rails that the radius of the curve be made large enough so that the flanged wheels of the bogies on which the crane rides do not bind with the rails. If the radius of the curve is small, the flanges on the wheels which keep the wheels on the rails cannot track during the traverse of the curve without binding with the vertical sides of the rails. This arrangement therefore requires relatively large radius turns in the tracks, and for large cranes this is unsatisfactory due to the high-cost of space in a cargo handling area and the resulting loss of utilization thereof. This is of particular importance in a port area alongside docks which are used for loading and unloading cargo container ships and adjacent to high density storage areas where these cranes operate, as well as for allowing cranes to turn corners to run on adjacent perpendicular docks.

Until the present invention, there has been no known way of having large cranes negotiate shorter-radius turns than the standard bogies were capable of handling while providing the same degree of stability required for loading and unloading operations as with standard bogie arrangements.

SUMMARY OF THE INVENTION

This invention relates to a gantry crane bogie lifting system for reduced radius turning of a rail mounted gantry crane which is supported by wheeled bogies mounted at each corner of the gantry. Each of the bogies includes sets of flanged support wheels which ride on support rails. At least two of the bogies are mounted at opposite ends of an equalizer beam and have all of the wheels of the bogies arranged to engage the same support rail having the shortest radius of curvature. The beam which supports those bogies is secured to the gantry by a universal pivot connection which allows the beam to pivot on both the vertical and horizontal axes. Jacking means are disposed between the sill beam of the gantry and the equalizer beam for allowing the equalizer beam to be pivoted around its horizontal axes of rotation when the jacking means is actuated in order to lift the outboard end of the equalizer beam and raise the sets of bogie support wheels disposed at the outboard end of the equalizer beam out of engagement with the support rail.

The present invention also relates to a method for reduced radius turning of a crane gantry supported by a multiplicity of bogies disposed at each corner of the gantry and which have flanged wheels which engage support rails which have curves as well as straight sections and wherein at least two of the bogies at one corner of the gantry are mounted at opposite ends of an equalizer beam. The beam is secured to the gantry by a universal pivot connection which allows the beam to pivot on both the vertical and horizontal axes with respect to the gantry. The method comprises pivoting the equalizer beam, which has wheeled bogies engaged with the same rail having the shortest radius of curvature, around its horizontal rotational axis to raise the sets of wheels disposed at the outboard en of the beam out of engagement with the support rail, and then moving the crane gantry along the rails and traversing the turn. When the crane gantry is again aligned on straight sections of support rails, the lifted set of bogie wheels are lowered to re-engage their respective support rail.

OBJECTS OF THE INVENTION

It is therefore an important object of the present invention to provide a new and novel method and apparatus for permitting large gantry cranes to traverse reduced radius turn on rails or tracks.

It is another object of the present invention to provide a method for permitting large cranes to make reduced radius turns by lifting a portion of the supporting bogie wheel structure so that fewer more closely spaced wheels remain in contact with the track or rail during the turn.

It is a further object of the present invention to provide an apparatus which permits lifting of a portion of the bogie wheels that support one side of the crane so it can negotiate shorter radius turns as compared with when all of the sets of wheels are in contact with the support rails.

It is still another object of the present invention to provide a new and novel method and apparatus that provides a smaller footprint of the wheels on the support rails during movement of the crane around curves.

Other objects and advantages of the present invention will become apparent when the method and apparatus of the present invention are considered in con]unction with the accompanying drawings.

DESCRIPTION OF THE PREFERRED EMBODIMENT

Reference is made to the drawings for a description of the preferred embodiment of the present invention wherein like reference numbers represent like elements on corresponding views.

Figure 1:
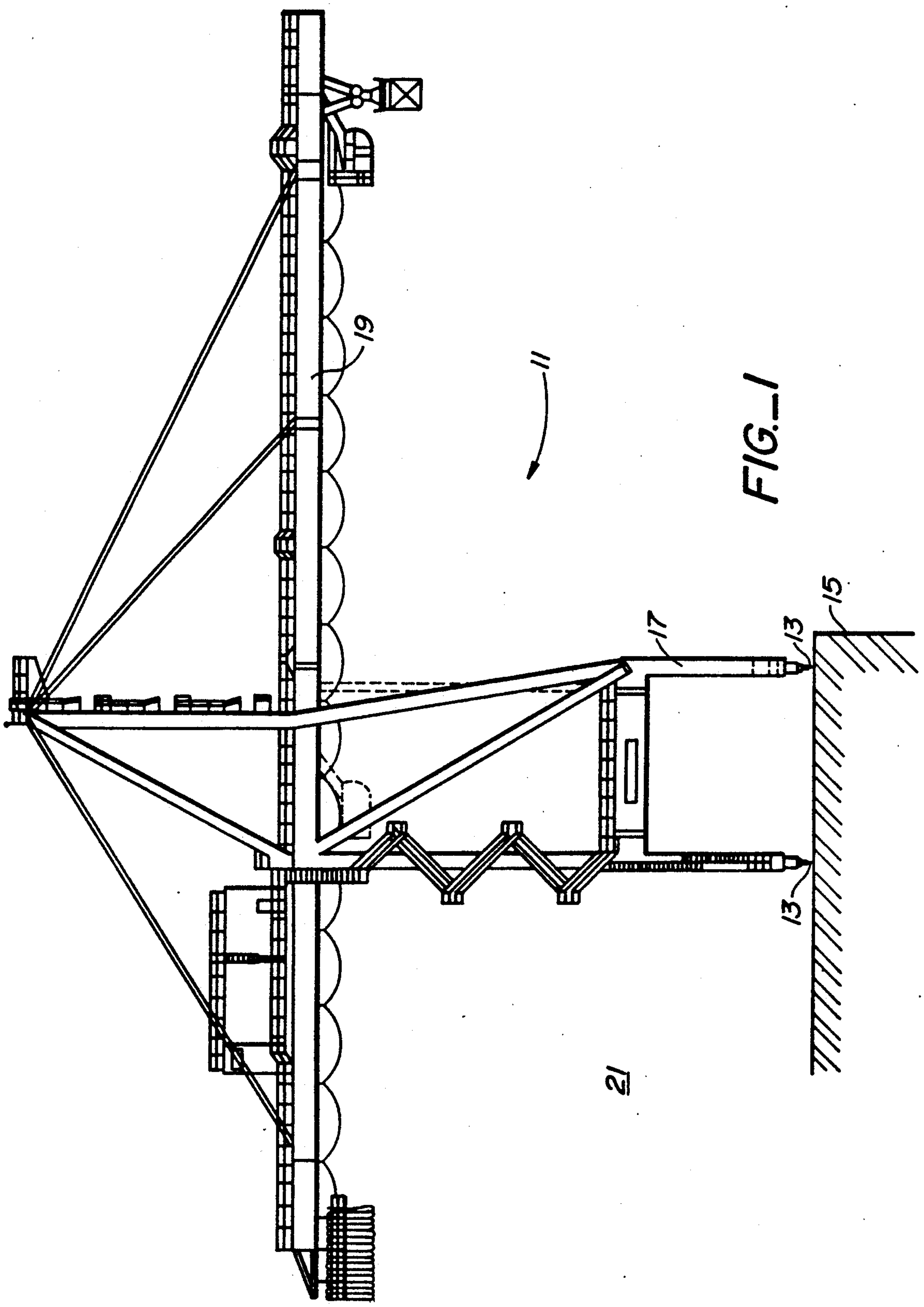
FIG. 1 is a side elevation of a typical gantry crane mounted on rails disposed along the edge of a dock.
Figure 8:
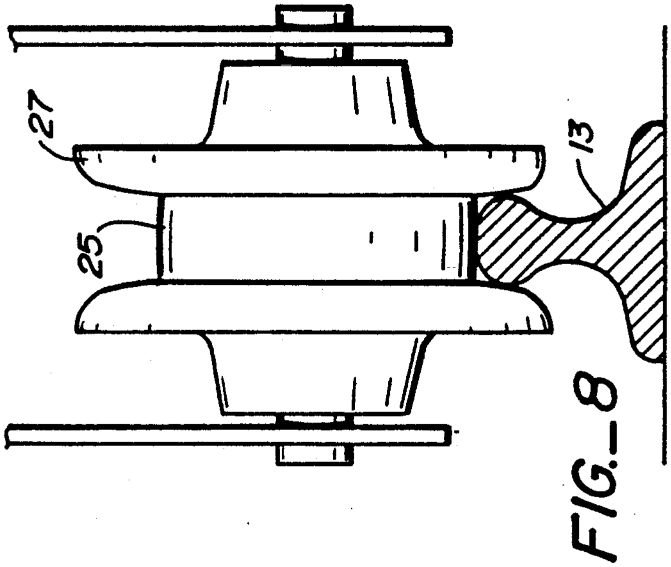
FIG. 8 is an elevation view of a wheel and track of the present invention.
Figure 2:
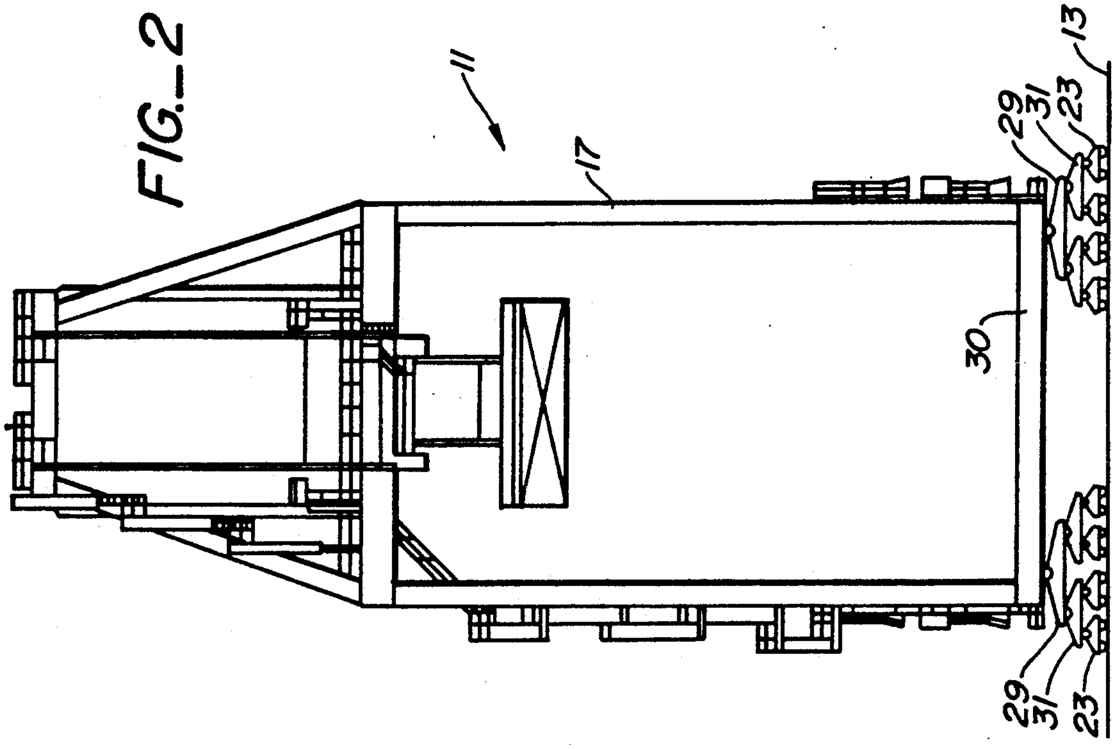
FIG. 2 is an end elevation of FIG. 1 viewed inboard from waterside.

FIG. 1 illustrates a typical gantry crane 11 mounted on support rails or tracks 13 disposed along the edge of a wharf or dock 15. The gantry 17 supports a boom 19 which extends outboard over a ship docked alongside the wharf. The boom also extends inboard or rearward of the crane over the cargo deposition or storage area 21. The crane can move laterally along the dock to service ships at different locations along the wharfside. The crane gantry is supported by a bogie system which includes a multiplicity of bogies 23 disposed at each of the corners of the crane gantry as illustrated in FIG. 2. Each of the bogies includes sets of flanged support wheels 25, usually a pair of wheels per bogie, which are mounted on the support rails or tracks as illustrated in FIG. 8. The flanges 27 are formed in pairs in order to project down on both sides of the rails to keep the wheels guided on the tracks.

Figure 3:
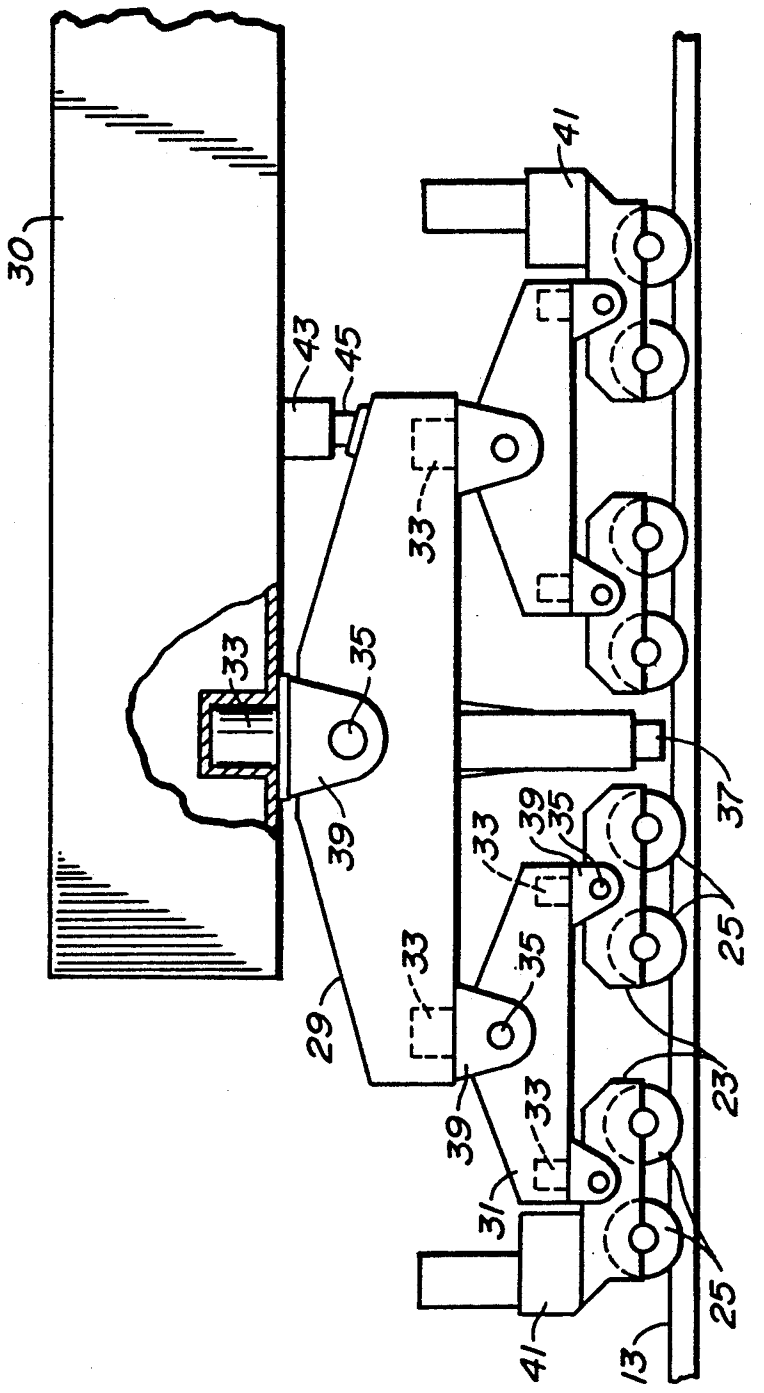
FIG. 3 is a side elevation of the bogie lifting arrangement of the present invention.
Figure 4:
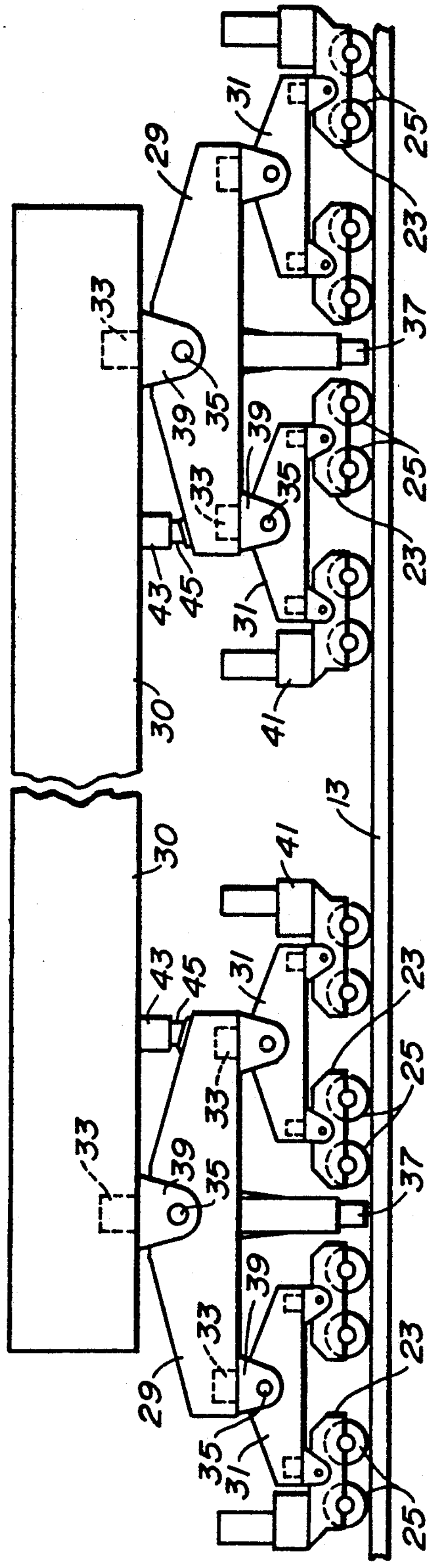
FIG. 4 is an elevation showing the bogies of the invention in crane operating position.
Figure 5:
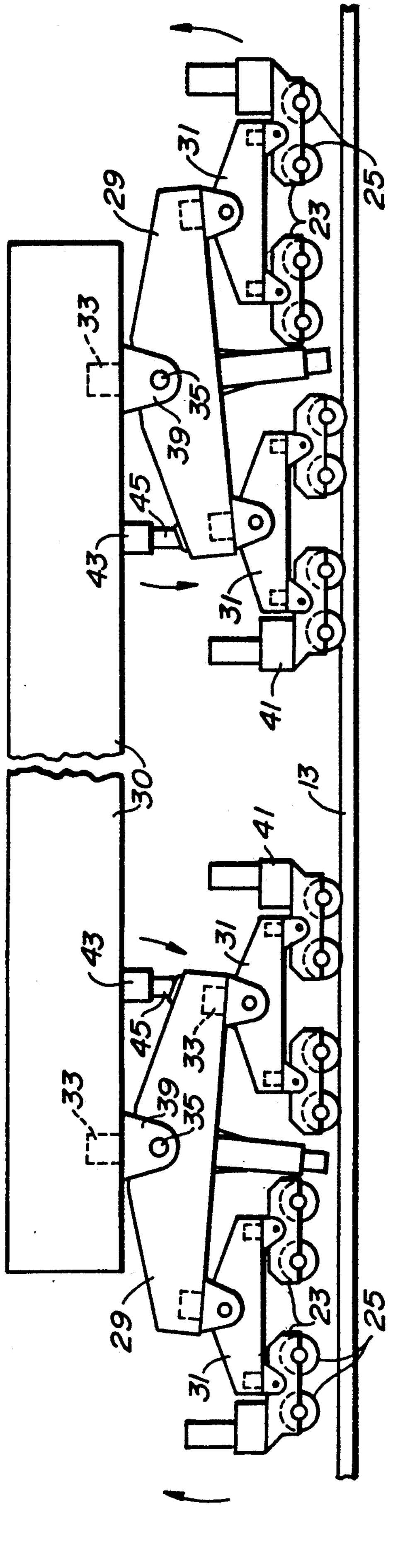
FIG. 5 is a further view of FIG. 4 showing the bogies lifted for traversing a curved section of track.

Reference is made to FIGS. 3-5. The lower corners of the crane 11 are secured to the bogie assemblies 23 with universal connections which allow the bogie assemblies to follow curves in the support rails and to travel over uneven railbeds. The universal connections are comprised of integrated rotatable and pivot connections having horizontal and vertical axes of rotation which in the preferred embodiment intersect.

The bogie assembly connection includes at least one equalizer beam 29 to which the bogies are attached at the ends. For a light-weight crane, a pair of bogies could be attached to the ends of just a single equalizer beam provided at each corner of the crane. There could possibly be some unique configuration of crane which would require only one equalizer beam at some corner thereof and to negotiate a tight turn would need to utilize the present invention, or the turn may not be so sharp as to require employment of the present invention at both corners of the crane on the inside of the curve of the tracks, so the basic configuration of the present invention contemplates employing only one equalizer beam disposed at one corner of a gantry crane on the inside of the curve although the preferred embodiment requires beams at each inside corner.

For heavier cranes, which would put too large a load on each wheel of a single equalizer beam system, main equalizer beams 29 are disposed at each corner of the gantry and intermediate equalizer beams 31 are employed at the ends of each main equalizer beam and likewise secured thereto with universal connections. A pair of bogie assemblies 23 are attached to each end of the intermediate equalizer beams thereby doubling the number of wheels in contact with the rails 13 thereby spreading the load over a larger footprint. Rotatable connections 33 allow partial rotation of the equalizer beams around the vertical axis whereby the wheels of the bogies can follow the curves in the support rails. Pivot connections 35 allow the wheels of the bogies to rise and fall independently and thereby traverse uneven railbeds. A rail brake 37 usually is formed to project downward from the center of the main equalizer beams 31. The brake can be lowered to contact the rails 13 as an emergency brake and prevent movement of the bogies along the tracks when the crane is in operation lifting loads.

In the present invention, each bogie assembly 23 in the system together with its intermediate equalizer beams and disposed on the inside of a curve in the tracks is secured to a main equalizer beam 29 which is pivoted to the corner of the sill beam 30 of the gantry 17 with universal connections whereby in addition to allowing the bogies to follow curves in the tracks in the horizontal plane, one of the bogies can be lifted out of contact with the rails by rotation of the main equalizer beam around a horizontal axis at its connection to the crane gantry. The universal connections include pivot connections having horizontal pivot pins 35 which project through flanges 39 depending from the gantry and the equalizer beams 29, 31 and are journaled through the lower attached structure, either the equalizer beams 31 or the wheeled bogies 23. These journal connections allow partial rotation of the lower members in a vertical plane around their respective horizontal journal shafts The universal connections also include rotatable connections 33 formed by vertical journal posts disposed at the top of the flanges 39 which support the horizontal pivot shafts. The vertical journal posts 33 are disposed in receptacles formed in the sill beam of the gantry and the equalizer beams with journal connections and permit partial rotation in the horizontal plane of the lower members which are secured between the flanges.

The intermediate equalizer beams 31 disposed at opposite ends of the main equalizer beams 29, at least those disposed on the inside of a curve in the tracks, are likewise provided with universal connections to the main equalizer beams to also allow partial rotation of the intermediate equalizer beams around both the vertical and horizontal axes, the same as with the attachment of the main equalizer beams to the sill beam 30 of the gantry. The bogies which are secured to the ends of each of the intermediate equalizer beams and contain the wheel assemblies are likewise mounted to the ends of the intermediate equalizer beams with universal connections.

Normally the areas where such cranes operate will not have a large amount of curved track, and most likely they will have only a curve in one direction. If that is so, then the present invention only need be employed on one side of the crane on whichever rail has the shortest radius of curvature. In any event, the invention will utilize at least one, and usually two, main equalizer beams, having bogies mounted at opposite ends thereof, disposed on the side of the crane having all of the wheels of said bogies arranged to engage the same rail having the shortest radius of curvature. This can either be shoreside or waterside. If the track curves in both directions with short radii, the invention will need to be employed on both sides of the crane for maximum mobility.

The intermediate equalizer beams 31 and bogies 23 which are located at positions underneath the crane structure are considered the inboard beams and bogies, while the other beams and bogies, at the ends of the intermediate equalizer beam and disposed essentially outside the periphery of the base of the crane structure in plan view, at the exposed end of the main equalizer beam, are considered the outboard equalizer beams and bogies.

In the simplest form of the invention, only the bogies 23 mounted on the intermediate equalizer beams 31 that are disposed on the side of the gantry that is located on the inside of the curve formed in the rails, and whose bogies remain in contact with the rails during turning on the reduced radius curve of track, need be provided with the universal assembly connection. If the railbed is level, the intermediate and main equalizer beams 29 disposed on the side of the gantry that is on the outside of the rail curve do not need to be rotatable about horizontal axes: only about vertical axes for tracking on the rails, but in practice the connections are made universal for continuity in construction and to accommodate uneven railbeds.

The outboard wheel assemblies on the outboard ends of the intermediate equalizer beams, on the inside of the curve side of the gantry, do not need to be pivotable about the vertical axes since they only are in contact with the rails when they are travelling in a straight line along the rails or are in contact with the rails on a straight section of the track. However, they are usually secured by universal connections for the same reasons as stated above.

The two end bogies 23 or wheel assemblies at each corner of the gantry are powered by gantry drive motors 41, which are usually electric, and these power the end wheels 25 of each of the two bogies at the ends of the main equalizer beams 29.

Figure 7:
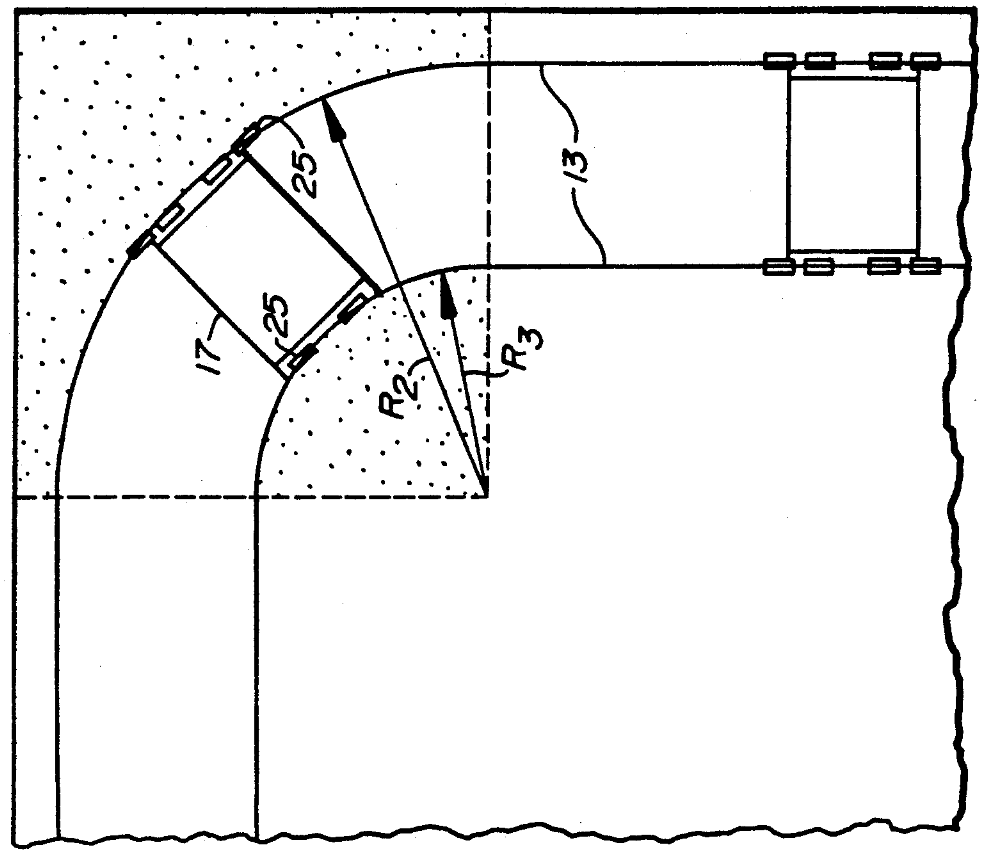
FIG. 7 is a schematic diagram in top plan view of rails and support wheels for a gantry crane employing the present invention.
Figure 6:
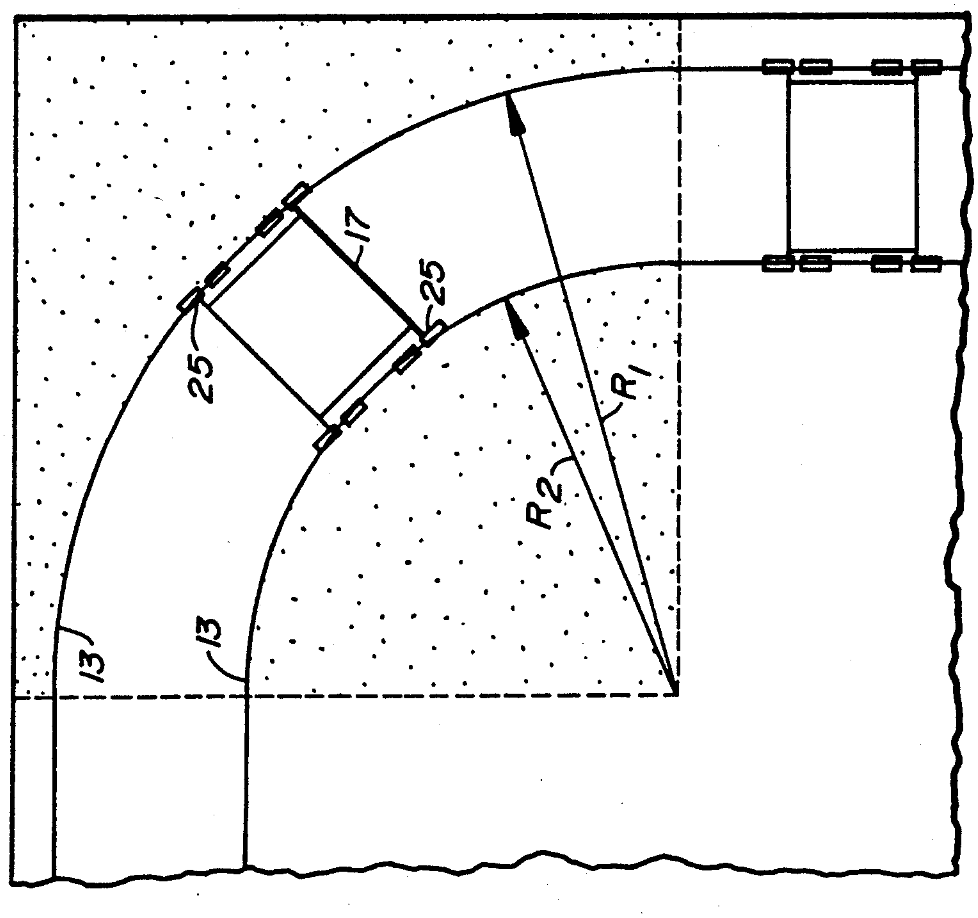
FIG. 6 is a schematic diagram in top plan view of rails and support wheels for a gantry crane as used with the present invention and the prior art.

A jacking means 43 is disposed between the inboard ends of the main equalizer beams 29 and the gantry structure 17 on the inside of the curve side of the gantry for lifting the sill beam 30 of the gantry structure by extending the jacking means between the gantry and the main equalizer beams. In the preferred embodiment, the jacking means includes a ram 45 which extends downward from said sill beam to bear against the top surface of the inboard end of the main equalizer beam with sliding contact. This is to allow the bogie remaining in contact with the rail to follow the track which may require the main equalizer beam to rotate about its vertical axis to keep the wheels of the bogie engaged with the track. When the ram is actuated, the action causes the main equalizer beams to pivot around the horizontal axis and lift the outboard intermediate equalizer beams 31 and the outboard bogies and wheel assemblies up and off the track. The weight of the crane is then supported solely by the inboard bogies disposed at the inboard ends of the inboard intermediate equalizer beams. As illustrated in FIGS. 6 and 7, lifting the outboard bogies in effect causes the crane gantry to have a shorter wheel base on the inboard side of the curve side of the crane which can thereby negotiate shorter radius turns. While the jacking means, in its most usual form, is a hydraulic cylinder, it could be a screw jack which pulls the outboard end of the main equalizer beam up off the rails or other lifting means.

FIG. 5 shows that once the jacking means is actuated, the inboard ends of the main idler beams are pushed away from the sill beam of the crane gantry thereby lifting it a slight amount as well as lifting the other end of the main idler beam whereby the wheel assemblies secured at the ends of the outboard intermediate idler beam are lifted out of engagement with the track rails. The crane is then in operative condition to negotiate the reduced radius turn of the tracks.

The reasons why the present invention works to achieve the results claimed are not readily apparent. It is not easy to determine what the limiting factors are which define the shortest radius of curve a crane can negotiate. If the flanges of the wheels are too close to the rail, the length of a bogie will dictate the shortest radius, but that is not the case in practice. The fact is that the articulating mechanism of the equalizer beams and bogies will negotiate very sharp curves, but when all of the bogies are kept in contact with the tracks, the structure of the gantry is pulled into the center of the curve and the wheels on the outside of the curve are pulled off the tracks to the inside of the curve. The solution provided by the present invention is to shorten the wheelbase on the inside of the curve whereby the structure of the crane remains over the tracks and the gauge between the tracks does not need to be narrowed to keep the wheels on the tracks: the clearance between the flanges on the wheels and the rails accommodates the smaller amount of inward movement of the gantry on the radius of the curve.

Thus, it will be apparent from the foregoing description of the invention, in its preferred form, that it will fulfill all the objects and advantages attributable thereto. While it is illustrated and described in considerable detail herein, the invention is not to be limited to such details as have been set forth except as may been necessitated by the appended claims.

I claim:

1. A gantry crane bogie lifting system for permitting reduced radius turning for cranes mounted on parallel support rails or tracks having curved as well as straight sections, said cranes having a four cornered gantry supported by wheeled bogies mounted at each corner thereof, each of said bogies including sets of flanged support wheels which ride on the rails or tracks, the bogie lifting system comprising, a pair of equalizer beams mounted at the corners of the gantry on the side thereof which traverses the curved rail of said tracks having the shortest radius of curvature, each of said beams having bogies mounted at each end thereof, all of the wheels of said bogies engaging the same rail, both of said beams being pivotable to lift the outboard ends thereof to raise the outboard sets of support wheels out of engagement with the curved support rail and to rotate as said crane traverses the curved section of track, and jacking means disposed between said gantry and said equalizer beams for causing said beams to be pivoted when the jacking means is actuated to lift the outboard ends of said beams and raise the sets of support wheels disposed at the outboard ends of said beams out of engagement with the support rail, said jacking means formed to permit said cranes to move along said rails or tracks and traverse the curved sections of track with the ends of the equalizer beams raised and to allow said equalizer beams to partially pivot around a vertical axis while said cranes are moving on said tracks.

2. The gantry crane bogie lifting system of claim 1 wherein each of said equalizer beams is secured to said gantry with universal pivot connections which allow partial rotation of the equalizer beams around both the vertical and the horizontal axes and at least said bogies on said equalizer beams which remain in contact with said rails while said cranes traverse a curved section of track being secured to said equalizer beams with universal pivot connections.

3. The gantry crane bogie lifting system of claim 1 wherein the jacking means includes a ram which extends from said gantry to bear against the top surface of the inboard ends of said equalizer beams with a sliding contact.

4. A gantry crane bogie lifting system for permitting reduced radius turning for cranes mounted on parallel support rails or tracks having curved as well as straight sections, said cranes having a gantry supported by bogies having sets of flanged support wheels which ride on the rials or tracks, said bogie lifting system comprising, a pair of main equalizer beams secured to the gantry by universal pivot connections and a pair of intermediate equalizer beams secured to the opposite ends of each of the main equalizer beams by universal pivot connections with the wheeled bogies secured to the opposite ends of said intermediate equalizer beams, said universal pivot connections allowing partial rotation of the equalizer beams around both the vertical and horizontal axes, a jacking mean disposed between said gantry and said main equalizer beams for allowing the beams to be pivoted around their horizontal axes of rotation when the jacking means is actuated to lift the outboard ends of said beams and raise the wheeled bogies disposed at ends of the outboard intermediate equalizer beams out of engagement with the support rails, said jacking means including rams which extend from said gantry structure to bear against the top surface of the inboard ends of the main equalizer beams with a sliding contact.

5. A method for permitting reduced radius turning of a four cornered gantry crane supported by a multiplicity of wheeled bogies disposed at each corner of the gantry and which have flanged wheels which engage parallel support rails or tracks having curved as well as straight sections and wherein at least two of the bogies at one corner of the gantry are mounted at opposite ends of an equalizer beam, said beam being secured to the gantry by a universal pivot connections which allows the beam to partially pivot on both vertical and horizontal axes with respect to said gantry, the method comprising pivoting said equalizer beam, having bogies with wheels engaged with the same rail having the shortest radius of curvature, around its horizontal rotational axis to raise the sets of wheels disposed at the outboard end of the beam out of engagement with the support rail, moving the crane gantry along the rails and traversing the curved section of rails, and when the crane gantry is again aligned on straight sections of support rails, lowering the lifted set of wheels to re-engage their respective support rail.

* * * * *